US 8,515,773 B2

(12) United States Patent
Hofrichter et al.

(10) Patent No.: US 8,515,773 B2
(45) Date of Patent: Aug. 20, 2013

(54) SYSTEM AND METHOD FOR ENABLING DISTRIBUTION AND BROKERING OF CONTENT INFORMATION

(75) Inventors: Klaus Hofrichter, Santa Clara, CA (US); Richter A. Rafey, Santa Clara, CA (US); Ravi Gauba, Fremont, CA (US); Annie Wang, San Jose, CA (US); Clement Lau, Los Altos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2506 days.

(21) Appl. No.: 09/921,199

(22) Filed: Aug. 1, 2001

(65) Prior Publication Data
US 2003/0028391 A1 Feb. 6, 2003

(51) Int. Cl.
*G06Q 10/00* (2012.01)

(52) U.S. Cl.
CPC ........................ *G06Q 10/00* (2013.01)
USPC .......................................................... 705/1.1

(58) Field of Classification Search
USPC ........................ 705/1.1; 713/176, 190, 193
See application file for complete search history.

(56) References Cited

U.S. PATENT DOCUMENTS

| 4,745,549 A | 5/1988 | Hashimoto |
| 4,965,825 A | 10/1990 | Harvey et al. |
| 5,134,499 A | 7/1992 | Sata et al. |
| 5,223,924 A | 6/1993 | Strubbe |
| 5,231,494 A | 7/1993 | Wachob |
| 5,371,551 A | 12/1994 | Logan |
| 5,406,626 A | 4/1995 | Ryan |
| 5,457,746 A | 10/1995 | Dolphin |
| 5,481,296 A | 1/1996 | Cragun et al. |
| 5,483,277 A | 1/1996 | Granger |
| 5,483,278 A | 1/1996 | Strubbe et al. |
| 5,524,051 A | 6/1996 | Ryan |
| 5,534,911 A | 7/1996 | Levitan |
| 5,553,281 A | 9/1996 | Brown et al. |
| 5,563,946 A | 10/1996 | Cooper et al. |
| 5,590,195 A | 12/1996 | Ryan |
| 5,614,940 A | 3/1997 | Cobbley et al. |
| 5,619,249 A | 4/1997 | Billock et al. |
| 5,625,464 A | 4/1997 | Compoint |

(Continued)

FOREIGN PATENT DOCUMENTS

| EP | 0676756 | 10/1995 |
| EP | 0726574 | 8/1996 |

(Continued)

OTHER PUBLICATIONS

Electronic House Com, EchoStart Communications Corporation and Geocast Network Systems Align to Deliver New Personalized Interactive Broadband Services to PC Users Via Satellite, Jun. 4, 2002, http://209.6.10.99/news101600echostar.html, 3 pages.

(Continued)

*Primary Examiner* — Traci Casler
(74) *Attorney, Agent, or Firm* — Blakely, Sokoloff, Taylor & Zafman LLP

(57) ABSTRACT

A system and method for enabling distribution and brokering of content information are described. A request to download data is transmitted to a server. Information on multiple content providers storing data obtained from the server is received. Finally, identification information for one content provider, which allowed the download of data, is transmitted to the server along with payment for the download of data.

32 Claims, 5 Drawing Sheets

(56) References Cited

U.S. PATENT DOCUMENTS

| | | | |
|---|---|---|---|
| 5,635,979 | A | 6/1997 | Kostreski |
| 5,638,443 | A * | 6/1997 | Stefik et al. ............... 705/54 |
| 5,699,107 | A | 12/1997 | Lawler et al. |
| 5,740,549 | A | 4/1998 | Reilly et al. |
| 5,748,890 | A | 5/1998 | Goldberg |
| 5,751,806 | A | 5/1998 | Ryan |
| 5,758,257 | A | 5/1998 | Herz et al. |
| 5,758,259 | A | 5/1998 | Lawler |
| 5,786,845 | A | 7/1998 | Tsuria |
| 5,790,177 | A | 8/1998 | Kallatly |
| 5,790,935 | A | 8/1998 | Payton |
| 5,797,010 | A | 8/1998 | Brown |
| 5,798,785 | A | 8/1998 | Hendricks et al. |
| 5,805,763 | A | 9/1998 | Lawler et al. |
| 5,826,102 | A | 10/1998 | Escobar et al. |
| 5,852,435 | A | 12/1998 | Vigneaux et al. |
| 5,861,881 | A | 1/1999 | Freeman et al. |
| 5,861,906 | A | 1/1999 | Dunn et al. |
| 5,884,056 | A | 3/1999 | Steele |
| 5,892,900 | A | 4/1999 | Ginter et al. |
| 5,900,905 | A | 5/1999 | Shoff et al. |
| 5,907,321 | A | 5/1999 | Grossman et al. |
| 5,931,908 | A | 8/1999 | Gerba et al. |
| 5,949,954 | A | 9/1999 | Young et al. |
| 5,982,363 | A | 11/1999 | Naiff |
| 5,995,155 | A | 11/1999 | Schindler et al. |
| 6,029,045 | A | 2/2000 | Picco et al. |
| 6,029,046 | A | 2/2000 | Khan et al. |
| 6,064,380 | A | 5/2000 | Swenson et al. |
| 6,078,360 | A | 6/2000 | Doornhein et al. |
| 6,081,533 | A | 6/2000 | Laubach et al. |
| 6,084,581 | A | 7/2000 | Hunt |
| 6,144,375 | A | 11/2000 | Jain et al. |
| 6,160,570 | A | 12/2000 | Sitnik |
| 6,173,406 | B1 | 1/2001 | Wang et al. |
| 6,175,925 | B1 | 1/2001 | Nardone et al. |
| 6,177,931 | B1 | 1/2001 | Alexander et al. |
| 6,178,509 | B1 | 1/2001 | Nardone et al. |
| 6,182,050 | B1 | 1/2001 | Ballard |
| 6,205,550 | B1 | 3/2001 | Nardone et al. |
| 6,215,526 | B1 | 4/2001 | Barton et al. |
| 6,226,444 | B1 | 5/2001 | Goldschmidt et al. |
| 6,233,389 | B1 | 5/2001 | Barton et al. |
| 6,236,395 | B1 | 5/2001 | Sezan et al. |
| 6,237,786 | B1 | 5/2001 | Ginter et al. |
| 6,253,193 | B1 | 6/2001 | Ginter et al. |
| 6,264,560 | B1 | 7/2001 | Goldberg |
| 6,269,369 | B1 | 7/2001 | Robertson |
| 6,289,346 | B1 | 9/2001 | Milewski et al. |
| 6,304,714 | B1 | 10/2001 | Krause et al. |
| 6,310,886 | B1 | 10/2001 | Barton |
| 6,327,418 | B1 | 12/2001 | Barton |
| 6,338,139 | B1 | 1/2002 | Ando et al. |
| 6,359,636 | B1 | 3/2002 | Schindler et al. |
| 6,366,296 | B1 | 4/2002 | Boreczky et al. |
| 6,377,861 | B1 | 4/2002 | York |
| 6,385,739 | B1 | 5/2002 | Barton et al. |
| 6,416,714 | B1 | 7/2002 | Nova et al. |
| 6,434,535 | B1 | 8/2002 | Kupka et al. |
| 6,434,747 | B1 | 8/2002 | Khoo |
| 6,460,036 | B1 | 10/2002 | Herz |
| 6,463,444 | B1 | 10/2002 | Jain et al. |
| 6,468,160 | B2 | 10/2002 | Eliott |
| 6,476,825 | B1 | 11/2002 | Croy et al. |
| 6,483,986 | B1 | 11/2002 | Krapf |
| 6,487,646 | B1 | 11/2002 | Adams et al. |
| 6,490,722 | B1 | 12/2002 | Barton et al. |
| 6,493,878 | B1 | 12/2002 | Kassalty |
| 6,498,895 | B2 | 12/2002 | Young et al. |
| 6,512,837 | B1 | 1/2003 | Ahmed |
| 6,516,467 | B1 | 2/2003 | Schindler et al. |
| 6,519,571 | B1 | 2/2003 | Guheen et al. |
| 6,526,577 | B1 | 2/2003 | Knudson et al. |
| 6,535,253 | B2 | 3/2003 | Barton et al. |
| 6,574,378 | B1 | 6/2003 | Lim |
| 6,584,552 | B1 | 6/2003 | Kuno et al. |
| 6,611,607 | B1 | 8/2003 | Davis et al. |
| 6,614,987 | B1 | 9/2003 | Ismail et al. |
| 6,625,295 | B1 | 9/2003 | Wolfgang et al. |
| 6,628,344 | B1 | 9/2003 | Weber |
| 6,636,273 | B1 | 10/2003 | Weber |
| 6,640,145 | B2 | 10/2003 | Holfberg et al. |
| 6,642,939 | B1 | 11/2003 | Vallone et al. |
| 6,643,798 | B2 | 11/2003 | Barton et al. |
| 6,678,389 | B1 | 1/2004 | Sun et al. |
| 6,697,948 | B1 | 2/2004 | Rabin et al. |
| 6,714,683 | B1 | 3/2004 | Tian et al. |
| 6,728,713 | B1 | 4/2004 | Beach et al. |
| 6,748,080 | B2 | 6/2004 | Russ et al. |
| 6,757,837 | B1 | 6/2004 | Platt et al. |
| 6,757,906 | B1 | 6/2004 | Look et al. |
| 6,848,002 | B1 * | 1/2005 | Detlef ............... 709/231 |
| 6,865,550 | B1 | 3/2005 | Cok |
| 6,868,403 | B1 * | 3/2005 | Wiser et al. ............... 705/51 |
| 7,058,414 | B1 | 6/2006 | Rofheart et al. |
| 7,123,813 | B2 | 10/2006 | Inoue |
| 7,231,669 | B2 | 6/2007 | Leung et al. |
| 7,359,883 | B2 | 4/2008 | Namba et al. |
| 7,546,627 | B2 | 6/2009 | Kawai |
| 2001/0018742 | A1 | 8/2001 | Hiraiq |
| 2002/0023230 | A1 | 2/2002 | Bolnick et al. |
| 2002/0040439 | A1 | 4/2002 | Kellum |
| 2002/0040475 | A1 | 4/2002 | Yap et al. |
| 2002/0059614 | A1 | 5/2002 | Lipsanen et al. |
| 2002/0083157 | A1 | 6/2002 | Sekiguschi et al. |
| 2002/0106197 | A1 | 8/2002 | Boyle |
| 2002/0138761 | A1 | 9/2002 | Kanemaki et al. |
| 2002/0170068 | A1 | 11/2002 | Rafey et al. |
| 2003/0088872 | A1 | 5/2003 | Maissel et al. |
| 2003/0126432 | A1 | 7/2003 | Tonnisson |
| 2003/0149988 | A1 | 8/2003 | Ellis et al. |
| 2003/0154390 | A1 | 8/2003 | Yamauchi et al. |
| 2003/0174861 | A1 * | 9/2003 | Levy et al. ............... 382/100 |
| 2003/0219127 | A1 | 11/2003 | Russ et al. |
| 2003/0221100 | A1 | 11/2003 | Russ et al. |
| 2004/0083377 | A1 | 4/2004 | Wu et al. |
| 2004/0107368 | A1 | 6/2004 | Colvin |
| 2004/0117320 | A1 | 6/2004 | Morioka et al. |
| 2004/0117663 | A1 | 6/2004 | Colvin |
| 2004/0177369 | A1 | 9/2004 | Akins |
| 2005/0144641 | A1 | 6/2005 | Lewis |
| 2005/0204392 | A1 | 9/2005 | Na |
| 2005/0289617 | A1 | 12/2005 | Safadi et al. |
| 2006/0212900 | A1 | 9/2006 | Ismail et al. |

FOREIGN PATENT DOCUMENTS

| | | |
|---|---|---|
| EP | 0862/328 | 9/1998 |
| WO | WO 80/02093 | 10/1980 |
| WO | WO 94/13107 | 6/1994 |
| WO | WO 97/41690 | 11/1997 |

OTHER PUBLICATIONS

Lost Remote, The TV Revolution is Coming, Lost Remote TV New Media & Television Convergence News, TV News Gets (too?) Personal by Cory Bergman, Sep. 25, 2000, http://www.lostremote.com/producer/personal.html, 2 pages.

"Automatic Constructions of Personalized TV News Programs", Association of Computing Machinery (ACM) Multimedia Conf., 323-331 (Presented Nov. 3, 1999).

"Metabyte Announces Personalized TV Software", Jan. 12, 1999, 2 pages, http://www.findwealth.com/metabyte-announces-personalized-tv-software-3252.

"TiVo brings home HBO through agreement benefiting personal television service users" Press Release, "Online!" Jan. 28, 1999, XP002154115, Retrieved from the Internet: <URL:www.tivo.com?, retrieved on Nov. 29, 2000.

"The Wave Report", Feb. 12, 1999, 2 pages, http://www.wave-report.com/1999_Wave_Issues/wave9016.html.

* cited by examiner

SYSTEM AND METHOD FOR ENABLING DISTRIBUTION AND BROKERING OF CONTENT INFORMATION

FIELD OF THE INVENTION

The present invention relates generally to data communication and, more particularly, to a system and method for enabling distribution and brokering of content information.

BACKGROUND

Today's broadband access to networks, such as the Internet and its subset, the World Wide Web, enables fast download and storage of content files to personal computer systems.

Typically, customers access a server, for example a content provider, select a set of content files residing on the server, possibly provide payment for the download of content files, and download the content files for local consumption. However, in this embodiment, since the content provider stores all the content files, access to the content may be slow due to network congestion or other reasons.

Alternatively, customers may download a number of content files from the server and may select from the previously downloaded content files, which are encrypted or locked using one of a number of available encryption techniques. After providing payment to the content provider, customers receive a decryption tool, for example a key for decrypting the content within the content files. This embodiment provides faster access to content, because the content is already downloaded at the customers' end. However, capacity issues, such as storage and bandwidth, may prevent content providers from using the pre-download technique, even if customers would make storage capacity available for download.

An alternate solution to the pre-download approach involves the distribution of content over a wide variety of private servers. Customers can access any one of the private servers and download the respective content files stored on the private server. However, this model cannot guarantee a revenue stream for the original content provider and cannot properly protect the copyright of the downloaded content files.

SUMMARY

A system and method for enabling distribution and brokering of content information are described. A request to download data is transmitted to a server. Information on multiple content providers storing data obtained from the server is received. Finally, identification information for one content provider, which allowed the download of data, is transmitted to the server along with payment for the download of data.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method for enabling distribution and brokering of content information are described.

In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
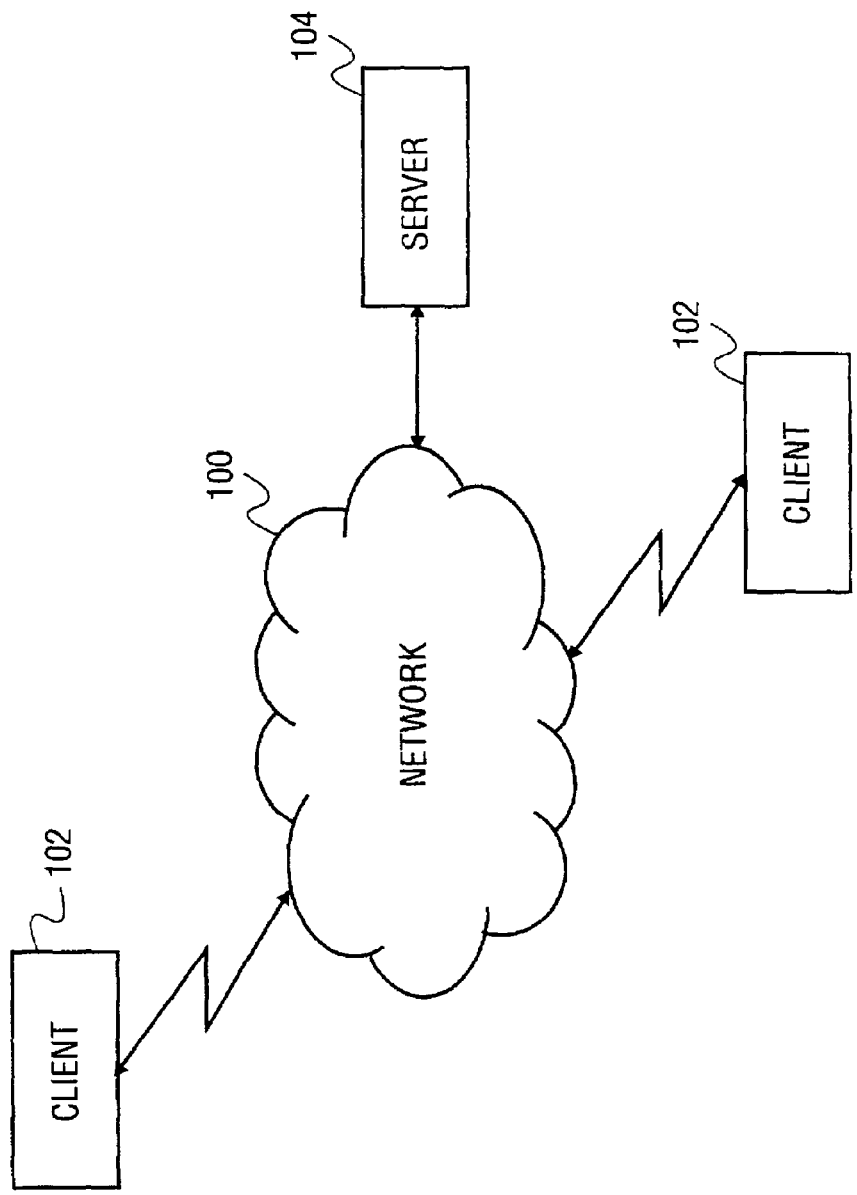
FIG. 1A is a block diagram of one embodiment for a network architecture.

FIG. 1A is a block diagram of one embodiment for a network architecture. Referring to FIG. 1A, the block diagram illustrates the network environment in which the present invention operates. In this conventional network architecture, a server computer system 104, for example a server operated by a content provider, is coupled to a network 100, for example a wide-area network (WAN). Wide-area network 100 includes the Internet, specifically the World Wide Web, or other proprietary networks, such as America Online™, CompuServe™, Microsoft Network™, and/or Prodigy™, each of which are well known to those of ordinary skill in the art. Wide-area network 100 may also include conventional network backbones, long-haul telephone lines, Internet service providers, various levels of network routers, and other conventional means for routing data between devices. Using conventional network protocols, server 104 may communicate through wide-area network 100 to a plurality of client computer systems 102, for example customers interested in downloading content information from server computer system 104, possibly connected through wide-area network 100 in various ways or directly connected to server 104. For example, as shown in the embodiment of FIG. 1A, client 102 is connected directly to wide-area network 100 through a digital broadband connection, or a direct or dial-up telephone connection or other network transmission line. Alternatively, client 102 may be connected to wide-area network 100 through a conventional modem pool (not shown) or other type of connection. In one embodiment, multiple clients 102 may be interconnected using the wide-area network 100 and may communicate with each other through the wide-area network 100.

Using one of a variety of network connection devices, in one embodiment, server 104 can also communicate directly with clients 102. In a particular implementation of this network configuration, a server computer 104 may operate as a web server if the World Wide Web (Web) portion of the Internet is used as wide-area network 100. Using the Hyper Text Transfer Protocol (HTTP) and the Hyper text Markup Language (HTML) across a network, web server 104 may communicate across the Web with a client 102. In this configuration, client 102 uses a client application program known as a web browser, such as the Netscape Navigator™ browser, published by America Online™, the Internet Explorer™ browser, published by Microsoft Corporation of Redmond, Wash., the user interface of America Online™, or the web browser or HTML translator of any other conventional supplier. Using such conventional browsers and the Web, client 102 may access graphical and textual data or video, audio, or tactile data provided by server 104. Conventional means exist by which client 102 may supply information to web server 104 through the network 100 and the web server 104 may return processed data to client 102.

Figure 1B:
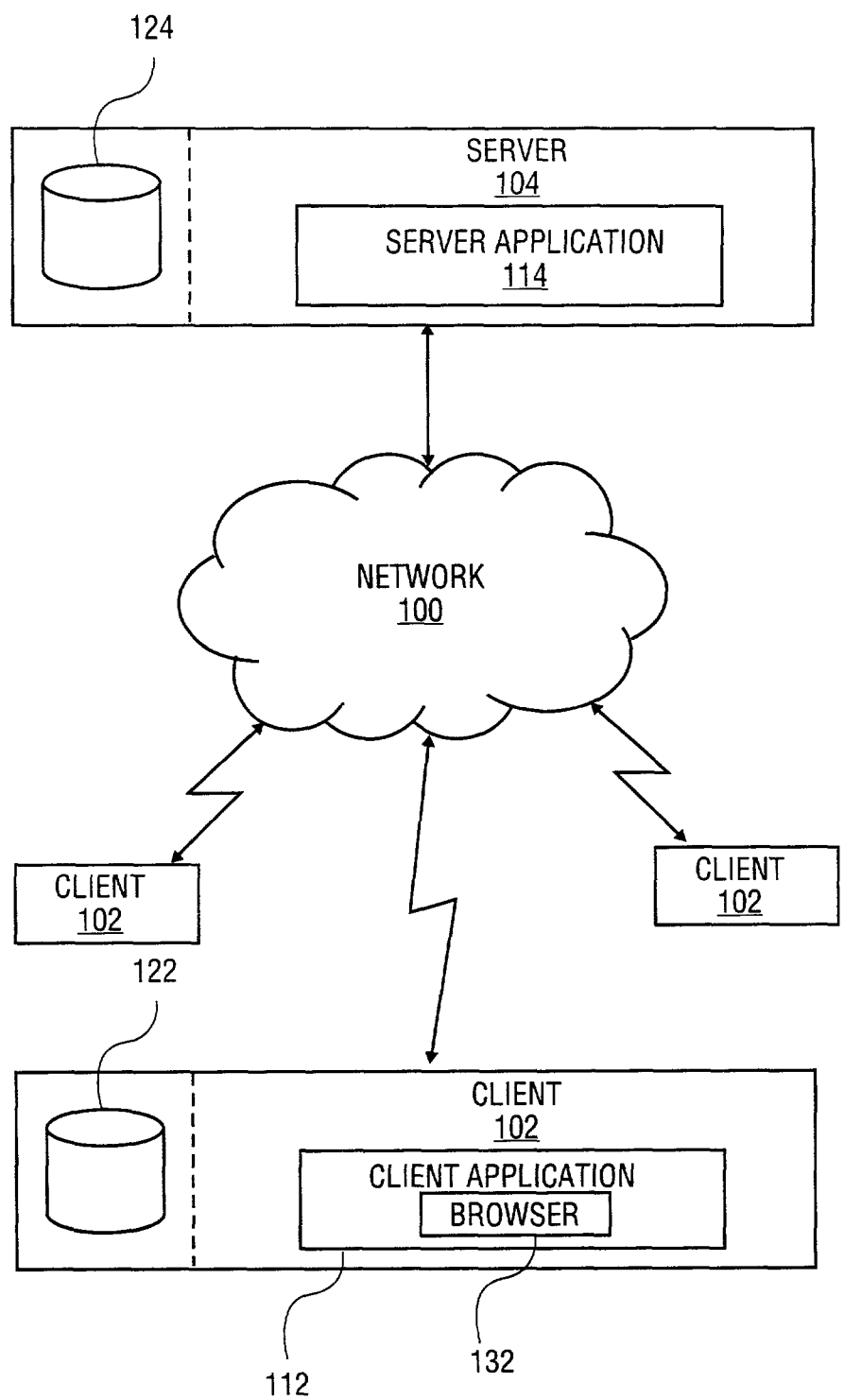
FIG. 1B is a block diagram of one embodiment for a system for enabling distribution and brokering of content information.

FIG. 1B is a block diagram of one embodiment for a system for enabling distribution and brokering of content information. As illustrated in FIG. 1B, in one embodiment, a server 104, for example a web server, is coupled with several clients 102, for example web clients, through wide-area network 100, such as the Internet. As described above, server 104 and web clients 102 may be implemented as conventional computer systems.

In one embodiment, software application programs for implementing the present invention run on web server 104 and at least one web client 102. As illustrated in FIG. 1B, the software application programs include a server portion of the application software, shown as server application 114, and a client portion of the application software, shown as client application 112. In addition, in one embodiment, web server 104 has access to a server storage module 124, for example a server database, which stores and manages content information and other types of information. In one embodiment, server storage module 124 is incorporated into web server 104. Alternatively, server storage module 124 may be operated as a database system independent of, but accessible to, the web server 104 through a local area network (not shown) or other means of communication.

Referring again to FIG. 1B, client application 112 includes a display component 132, for example a browser. In addition, web client 102 has access to a client storage module 122, for example a client database, which stores and manages content information and other types of information. In one embodiment, client storage module 122 is incorporated into web client 102. Alternatively, client storage module 122 may be operated as a database system independent of, but accessible to, the web client 102 through a local area network (not shown) or other means of communication.

In one embodiment, server database 124 within server 104, for example a server operated by a content provider, stores encrypted data, for example a plurality of encrypted content files, such as audio/video content files, which can be accessed and downloaded by multiple clients 102 via network 100. In one embodiment, the content files are encrypted using one of a number of available encryption techniques.

In one embodiment, a user activates client application 112 within client 102 to transmit a request to server 104 to download encrypted data through network 100. If server 104 can accommodate the request, server application 114 accesses server database 124 and retrieves the encrypted data. Server 104 then transmits the encrypted data to client 102. Client application 102 receives and stores the encrypted data in the client database 122.

Subsequently, client application 102 transmits a request to server 104 to download a decryption tool, for example a decryption key, configured to allow access to the encrypted data. In one embodiment, client application 112 uses browser 132 to communicate with the user and to prompt the user to provide payment information for the use of the decryption tool. After it receives the payment information, client application 112 sends an electronic payment to server 104 for the use of the decryption tool. In return, server application 114 within server 104 transmits the decryption tool to client 102.

In one embodiment, if client 102 decides to become a content provider and to allow retrieval of the encrypted data from its site, client application 112 within client 102 transmits a request to server 104 to download a distribution tool, for example a distribution key, from server 104. In one embodiment, the distribution tool identifies client 102 as a content provider, which stores encrypted data obtained from server 104 and makes encrypted data available to other clients 102. Server application 114 within server 104 accesses the server database 124 to retrieve the distribution tool and transmits the distribution tool to client 102.

In one embodiment, after the distribution tool is received from server 104, client application 112 applies the distribution tool to the encrypted data stored in client database 122 and embeds the identification information into the encrypted data. In one embodiment, the distribution tool is embedded in the encrypted data as a watermark, for example a digital watermark, using one of many known types of watermarking methods. The watermark contains identification information about server 104 and the client 102 which allows retrieval of the encrypted data from its site.

In an alternate embodiment, if client 102 decides to become a content provider and subsequently downloads the distribution tool, server 104 may also store the distribution tool and its relationship with client 102 in a list of additional content providers stored within server database 124 and may provide the distribution tool to other clients 102 requesting the same encrypted data, as described in further detail below.

In one embodiment, client 102 becomes a content provider for a predetermined period of time. After the predetermined period of time, the distribution tool expires and client application 112 within client 102 needs to send a new request to server 104 to update the distribution tool and to reinstate its status as content provider.

Alternatively, client 102 may become a content provider until it transmits a request to server 104 to be removed from the list of additional content providers stored in server database 124. In this embodiment, client application 112 transmits the request and server application 114 within server 104 accesses the server database 124 and removes the client 102 from the list of additional content providers.

In another alternate embodiment, server 104 may periodically poll each client 102, which is an additional content provider, using one of many available polling methods. Server 104 may then determine the status of each polled client 102 and may remove any client 102 that requests to be removed.

In one embodiment, if server 104 is overloaded and cannot accommodate the request received from client application 112, server application 114 accesses the server database 114 and retrieves the list of additional content providers. Server application 114 transmits information on additional content providers to client 102, for example links to the additional providers which store the encrypted data obtained from server 104 and which allow retrieval of the requested encrypted data from their sites. In one embodiment, the additional content providers are also clients 102 connected to server 104 via network 100.

In one embodiment, client 102 requesting the download of encrypted data communicates with one of the additional content providers using one of the provided links. If the accessed content provider can accommodate the request, the client application 112 of client 102 downloads the encrypted data and the embedded distribution tool, which identifies the particular content provider, and stores the encrypted data in client database 122. Client application 112 then transmits a request to server 104 to download the decryption tool for decrypting the retrieved data and provides payment for the use of the decryption tool, as described in detail above.

At the same time, in one embodiment, client application 112 communicates to server 104 identification information related to the accessed content provider, for example the distribution tool identifying the content provider. After the decryption tool is transmitted to client 102, server application 114 sends a fee to the content provider, which accommodated the request and allowed the download of encrypted data. In one embodiment, the fee is predetermined and represents a percentage of the payment for the use of the decryption tool provided by client 102.

In an alternate embodiment, if server 104 cannot accommodate the request, it may provide information on additional content providers to client 102, which may include the links to the additional providers, as well as the distribution tool associated with each additional content provider. Client 102 may use the links to connect and download encrypted data from one content provider. Once the encrypted data is downloaded, client 102 may communicate the distribution tool associated with the content provider back to server 104 for proper credit of the fee.

Figure 2:
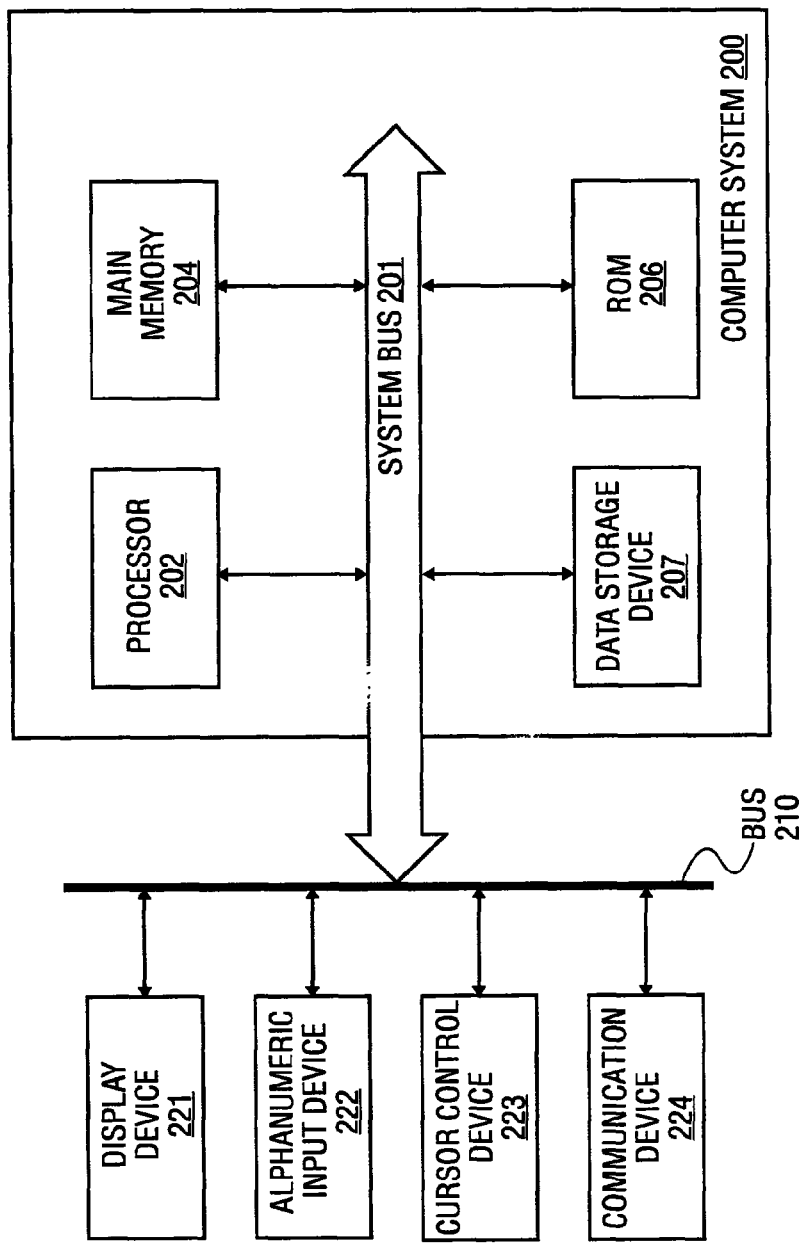
FIG. 2 is a block diagram of one embodiment for a computer system.

Having briefly described one embodiment of the network environment in which the present invention operates, FIG. 2 shows one embodiment of a computer system, which illustrates an exemplary client 102 or server 104 computer system in which the features of the present invention may be implemented.

In one embodiment, computer system 200 includes a system bus 201, or other communications module similar to the system bus, for communicating information, and a processing module, such as processor 202, coupled to bus 201 for processing information. Computer system 200 further includes a main memory 204, such as a random access memory (RAM) or other dynamic storage device, coupled to bus 201, for storing information and instructions to be executed by processor 202. Main memory 204 may also be used for storing temporary variables or other intermediate information during execution of instructions by processor 202.

In one embodiment, computer system 200 also comprises a read only memory (ROM) 206, and/or other similar static storage device, coupled to bus 201, for storing static information and instructions for processor 202.

In one embodiment, an optional data storage device 207, such as a magnetic disk or optical disk, and its corresponding drive, may also be coupled to computer system 200 for storing information and instructions. System bus 201 is coupled to an external bus 210, which connects computer system 200 to other devices. In one embodiment, computer system 200 can be coupled via bus 210 to a display device 221, such as a cathode ray tube (CRT) or a liquid crystal display (LCD), for displaying information to a computer user. For example, graphical or textual information may be presented to the user on display device 221. Typically, an alphanumeric input device 222, such as a keyboard including alphanumeric and other keys, is coupled to bus 210 for communicating information and/or command selections to processor 202. Another type of user input device is cursor control device 223, such as a conventional mouse, touch mouse, trackball, or other type of cursor direction keys, for communicating direction information and command selection to processor 202 and for controlling cursor movement on display 221. In one embodiment, computer system 200 may optionally include video, camera, speakers, sound card, and many other similar conventional options.

A communication device 224 is also coupled to bus 210 for accessing remote computers or servers, such as server 104, or other servers via the Internet, for example. The communication device 224 may include a modem, a network interface card, or other well-known interface devices, such as those used for interfacing with Ethernet, Token-ring, or other types of networks. In any event, in this manner, the computer system 200 may be coupled to a number of servers 104 via a conventional network infrastructure such as the infrastructure illustrated in FIG. 1A and described above.

Figure 3:
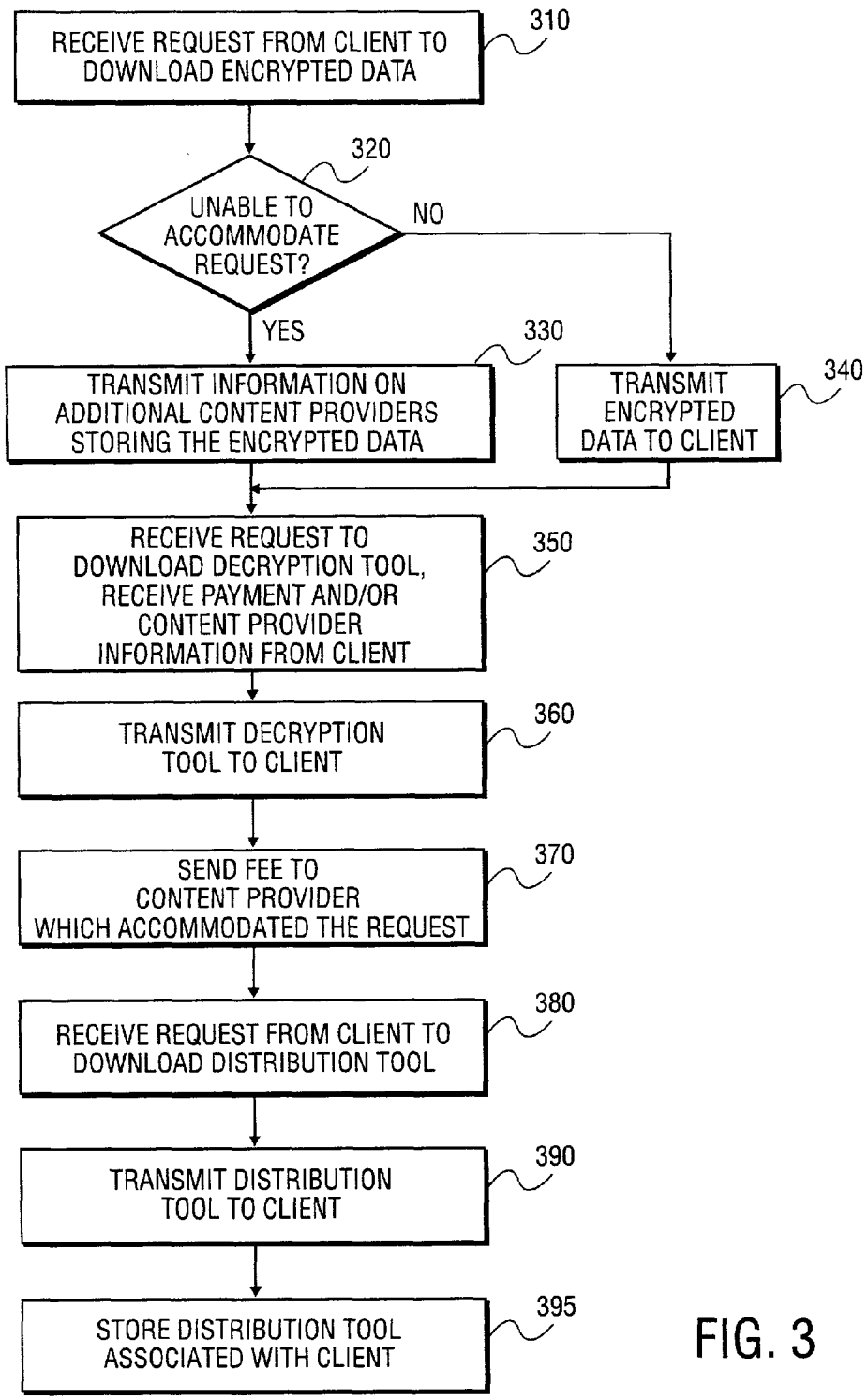
FIG. 3 is a flow diagram of one embodiment for a method for enabling distribution and brokering of content information from a server's perspective.

FIG. 3 is a flow diagram of one embodiment for a method for enabling distribution and brokering of content information from a server's perspective. As illustrated in FIG. 3, at processing block 310, server 104 receives a request from client 102 to download encrypted data.

At processing block 320, a decision is made whether server 104 is unable to accommodate the request. If server 104 is able to accommodate the request and to allow download of the encrypted data, then at processing block 340, encrypted data is transmitted to client 102.

Otherwise, if server 104 is unable to accommodate the request, at processing block 330, server 104 transmits information on additional content providers storing the encrypted data obtained from server 104, for example links to the content providers. In one embodiment, the additional content providers are clients 102, which have decided to become content providers and to allow other clients 102 to download encrypted data residing on their sites. In one embodiment, the information on additional content providers includes links to the content providers and a distribution tool associated with each content provider, which identifies the content provider and its relationship to server 104.

At processing block 350, server 104 receives a request from client 102 to download a decryption tool for decrypting the downloaded data. In one embodiment, server 104 also receives payment for the use of the decryption tool. Alternatively, server 104 receives the payment and identification information for the content provider, for example the distribution tool identifying the content provider, which accommodated the request and allowed the download of encrypted data.

At processing block 360, server 104 transmits the decryption tool to client 102. At processing block 370, if client 102 downloaded the encrypted data from one of the additional content providers able to accommodate the request, server 104 sends a fee to the respective content provider. In one embodiment, the fee is predetermined and represents a percentage of the payment received from client 102.

At processing block 380, if client 102 decides to become a content provider and to allow retrieval of the encrypted data residing on its site, server 104 receives a request to download a distribution tool, which identifies client 102 in future transactions. After it receives the request for the distribution tool, at processing block 390, server 104 transmits the distribution tool to client 102. Finally, in one embodiment, at processing block 395, server 104 stores the distribution tool associated with client 102.

Figure 4:
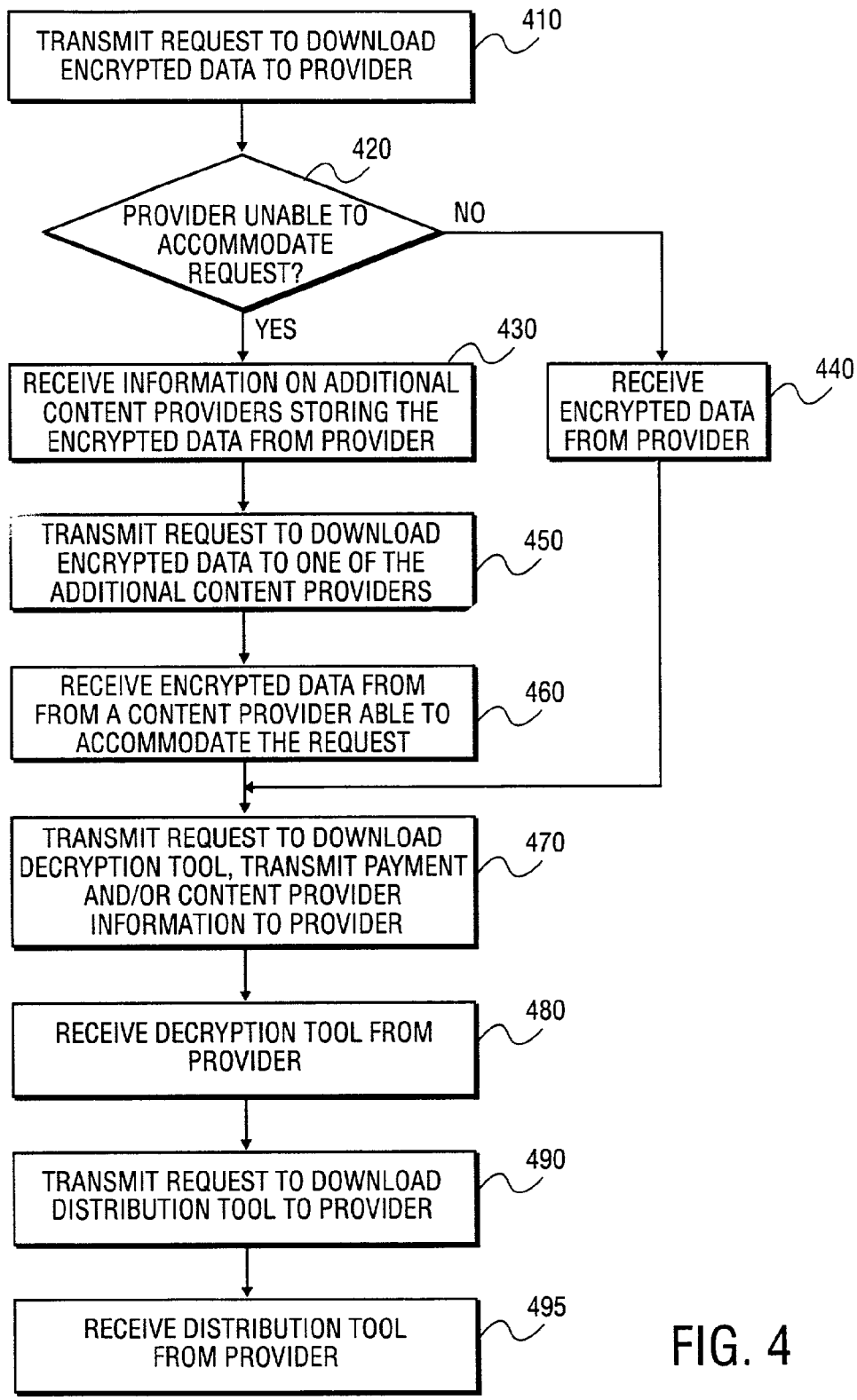
FIG. 4 is a flow diagram of one embodiment for a method for enabling distribution and brokering of content information from a client's perspective.

FIG. 4 is a flow diagram of one embodiment for a method for enabling distribution and brokering of content information from a client's perspective. As illustrated in FIG. 4, at processing block 410, client 102 transmits a request to download encrypted data to server 104, for example a server operated by a content provider.

At processing block 420, a decision is made whether content provider server 104 is unable to accommodate the request. If server 104 is able to accommodate the request, at processing block 440, client 102 receives the encrypted data.

Otherwise, if server 104 is unable to accommodate the request, at processing block 430, client 102 receives information on additional content providers storing encrypted data obtained from server 104 on their sites. In one embodiment, client 102 receives links to the additional content providers. Alternatively, client 102 may receive the links to the content providers and a distribution tool for each content provider.

At processing block 450, client 102 transmits a request to download encrypted data to one of the additional content providers able to accommodate the request. At processing block 460, client 102 receives the encrypted data and identification information from the content provider. In one embodiment, the identification information is the distribution tool identifying the content provider.

At processing block 470, client 102 transmits a request to download the decryption tool to server provider 104. In one embodiment, if server 104 provided the encrypted data, client 102 also sends payment for the use of the decryption tool. Alternatively, if one of the additional content providers provided the encrypted data, client 102 sends the payment and the identification information for the content provider, for example the distribution tool identifying the content provider, to server 104. At processing block 480, client 102 receives the decryption tool from server provider 104.

At processing block 490, if client 102 decides to become a content provider and to allow downloads of the encrypted data residing on its site, client 102 transmits a request to download a distribution tool, identifying client 102 in future transactions. Finally, at processing block 495, client 102 receives the distribution tool from server provider 104.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computerized method for execution by a client, the method comprising:
transmitting, by the client, a request to download data, wherein said data comprises a content file;
receiving identification information and data downloaded from one of a plurality of content providers storing said data, said identification information identifying said one content provider and obtained by said one content provider from an original content provider of said data, wherein a server maintains a list of the plurality of content providers that provide the content file;
transmitting, to said original content provider, said identification information for said one content provider, which downloaded said data, along with payment for the download of said data;
transmitting, to said original content provider, a request for a distribution tool identifying said client as an additional content provider that distributes said data to other clients;
receiving said distribution tool, wherein the distribution tool includes identification information for the server and the client;
applying, by the client, said distribution tool to said data to identify said client as an additional content provider prior to distributing said data to a different client, wherein the distribution tool is embedded in said data and the distribution tool is subsequently transmitted to the server by the different client after the different client downloads said data from said client, said clients are operated by users of the content file; and
in response to said applying, transmitting, to the server, a request that the client is to be identified in the list of the plurality of content providers as an additional content provider that provides the content file, wherein the list of the plurality of content providers providing the content file is updated to include the client that requested and paid for said data as the additional content provider providing the content file.

2. The method according to claim 1, wherein said data is encrypted and contains a plurality of encrypted content files.

3. The method according to claim 1, wherein applying said distribution tool comprises embedding said distribution tool within said data.

4. The method according to claim 2, wherein transmitting said identification information further comprises:
transmitting said payment for download of a decryption tool for decrypting said data; and
receiving said decryption tool.

5. A computerized method for execution by an original content provider, the method comprising:
receiving, from a client, identification information for one of a plurality of content providers, which downloaded of data to said client, along with payment for the download of said data, wherein said data comprises a content file and a server maintains a list of the plurality of content providers that provide the content file;
receiving, from said client, a request for a distribution tool identifying said client as an additional content provider that distributes said data to other clients, wherein the distribution tool includes identification information for the server and the client;
transmitting, by the server, said distribution tool to said client for subsequent application of the distribution tool to said data by said client to identify said client as an additional content provider prior to distributing said data to a different client by said client, wherein the distribution tool is embedded in said data and said clients are operated by users of the content file;
in response to the client applying the distribution tool, receiving a request that the client is to be identified in the list of the plurality of content providers as an additional content provider that provides the content file, wherein the client transmits, to the server, the request that the client is to be identified in the list of the plurality of content providers as an additional content provider that provides the content file.

updating the list of the plurality of content providers providing the content file to include the client as the additional content provider providing the content file; and receiving the distribution tool from the different client after the different client downloads said data from the client.

6. The method according to claim 5, wherein said data is encrypted and contains a plurality of encrypted content files.

7. The method according to claim 5, further comprising storing said distribution tool identifying said client.

8. The method according to claim 5, wherein said distribution tool comprises a digital watermark.

9. The method according to claim 6, wherein receiving said identification information further comprises:
receiving said payment for download of a decryption tool for decrypting said data; and
transmitting said decryption tool to said client.

10. The method according to claim 5, further comprising transmitting a fee to said one content provider.

11. The method according to claim 10, wherein said fee is predetermined and represents a percentage of said payment received for the download of said data.

12. A system comprising:
a client configured to transmit a request to download data, wherein said data comprises a content file; and
a server for an original content provider coupled to said client and configured to receive identification information for one of a plurality of content providers, which downloaded said data to said client, along with payment for the download of said data, to maintain a list of the plurality of content providers providing the content file, to receive a request for a distribution tool identifying said client as an additional content provider that distributes said data to other clients, wherein the distribution tool includes identification information for the server and the client; to transmit said distribution tool to said client, wherein said client is further configured to receive and apply said distribution tool to said content to identify said client as an additional content provider prior to distributing said data to a different client by said client, wherein the distribution tool is embedded in said data and said clients are operated by users of the content file, in response to said client applying said distribution tool, to receive a request that the client is to be identified in the list of the plurality of content providers as an additional content provider that provides the content file, wherein the client transmits, to the server, the request that the client is to be identified in the list of the plurality of content providers as an additional content provider that provides the content file, to update the list of the plurality of content providers providing the content file to include the client as the additional content provider providing the content file, and to receive the distribution tool from the different client after the different client downloads said data from the client.

13. The system according to claim 12, wherein said data is encrypted and contains a plurality of encrypted content files.

14. The system according to claim 12, wherein said server stores said distribution tool identifying said client.

15. The system according to claim 12, wherein said distribution tool comprises a digital watermark.

16. The system according to claim 13, wherein said server further receives said payment for download of a decryption tool for decrypting said data from said client, and transmits said decryption tool to said client.

17. The system according to claim 12, wherein said server further transmits a fee to said one content provider.

18. The system according to claim 17, wherein said fee is predetermined and represents a percentage of said payment received for the download of said data.

19. A computer readable medium containing executable instructions, which, when executed in a processing system for a client, cause said system to perform a method comprising:
transmitting a request to download data, wherein said data comprises a content file;
receiving identification information and data from one of a plurality of content providers storing said data, said identification information identifying said one content provider and obtained by said one content provider from an original content provider of said data, wherein a server maintains a list of the plurality of content providers providing the content file;
transmitting, to said original content provider, said identification information for said one content provider, which downloaded said data, along with payment for the download of said data;
transmitting to said original content provider, a request for a distribution tool identifying said client as an additional content provider that distributes said data to other clients;
receiving said distribution tool, wherein the distribution tool includes identification information for the server and the client; and
applying said distribution tool to said data to identify said client as an additional content provider prior to distributing said data to a different client, wherein the distribution tool is embedded in said data and the distribution tool is subsequently transmitted to the server by the different client after the different client downloads said data from said client, said clients are operated by users of the content file; and
in response to said applying, transmitting, to the server, a request that the client is to be identified in the list of the plurality of content providers as an additional content provider that provides the content file, wherein the list of the plurality of content providers providing the content file is updated to include the client as the additional content provider providing the content file.

20. The computer readable medium according to claim 19, wherein said data is encrypted and contains a plurality of encrypted content files.

21. The computer readable medium according to claim 19, wherein said distribution tool comprises a digital watermark.

22. The computer readable medium according to claim 20, wherein transmitting said identification information further comprises:
transmitting said payment for download of a decryption tool for decrypting said data; and
receiving said decryption tool.

23. A computer readable medium containing executable instructions, which, when executed in a processing system for an original content provider, cause said system to perform a method comprising:
receiving, from a client, identification information for one of a plurality of content providers, which downloaded of data to said client, along with payment for the download of said data, wherein said data comprises a content file and a server maintains a list of the plurality of content providers providing the content file;
receiving, from said client, a request for a distribution tool identifying said client as an additional content provider that distributes said data to other clients, wherein the distribution tool includes identification information for the server and the client;

transmitting said distribution tool to said client for subsequent application to said data by said client to identify said client as an additional content provider prior to distributing said data to a different client by said client, wherein the distribution tool is embedded in said data and said clients are operated by users of the content file; and in response to the client applying the distribution tool, receiving a request that the client is to be identified in the list of the plurality of content providers as an additional content provider that provides the content file, wherein the client tranmits, to the server, the request that the client is to be identified in the list of the plurality of content providers as an additional content provider that provides the content file;

updating the list of the plurality of content providers providing the content file to include the client as the additional content provider that provides the content file; and receiving the distribution tool from the different client after the different client downloads said data from the client.

24. The computer readable medium according to claim 23, wherein said data is encrypted and contains a plurality of encrypted content files.

25. The computer readable medium according to claim 23, wherein the method further comprises storing said distribution tool identifying said client.

26. The computer readable medium according to claim 23, wherein said distribution tool comprises a digital watermark.

27. The computer readable medium according to claim 24, wherein receiving said identification information further comprises:
  receiving said payment for download of a decryption tool for decrypting said data; and
  transmitting said decryption tool to said client.

28. The computer readable medium according to claim 23, wherein the method further comprises transmitting a fee to said one content provider.

29. The computer readable medium according to claim 28, wherein said fee is predetermined and represents a percentage of said payment received for the download of said data.

30. A computerized method for execution by a client, the method comprising:
  transmitting, by the client, a request to receive data, wherein said data comprises a content file;
  receiving said data from a first content provider for said data, said first content provider being one of a plurality of content providers making data available to said client, wherein a server maintains a list of the plurality of content providers providing the content file;
  receiving identification information that identifies said first content provider, said identification information obtained by said first content provider from an original content provider of the data;
  transmitting said identification information and payment for said data to said original content provider;
  transmitting a request for a distribution tool to said original content provider, wherein said request for a distribution tool identifies said client as an additional content provider that distributes said data to other clients;
  receiving said distribution tool, wherein the distribution tool includes identification information for the server and the client; and
  applying said distribution tool to said data to identify said client as an additional content provider prior to distributing said data to a different client, wherein the distribution tool is embedded in said data and the distribution tool is subsequently transmitted to the server by the different client after the different client downloads said data from said client, said clients are operated by users of the content file; and
  in response to said applying, transmitting, to the server, a request that the client is to be identified in the list of the plurality of content providers as an additional content provider that provides the content file, wherein the list of the plurality of content providers providing the content file is updated to include the client as the additional content provider providing the content file.

31. A computerized method for execution by an original content provider, the method comprising:
  maintaining a list of a plurality of content providers that providing a content file;
  receiving, from a first client, identification information for a first content provider that provided said data to said first client, said first content provider being one of the plurality of content providers making said data available to said first client, wherein said data comprises the content file;
  receiving, from said first client, payment for said data;
  receiving, from said first client, a request for a distribution tool, wherein the distribution tool identifies said first client as an additional content provider that provides the content file to other clients, wherein the distribution tool includes identification information for the server and the client;
  transmitting said distribution tool to said first client for subsequent application of the distribution tool to said data by said client to identify said first client as an additional content provider prior to distributing said data to a second client by said first client, wherein the distribution tool is embedded in said data and said clients are operated by users of the content file; and
  in response to the client applying the distribution tool, receiving a request that the client is to be identified in the list of the plurality of content providers as an additional content provider that provides the content file and the client transmits, to the server, the request that the client is to be identified in the list of the plurality of content providers as an additional content provider that provides the content file;
  updating the list of the plurality of content providers providing the content file to include the client as the additional content provider that provides the content file; and
  receiving the distribution tool from the different client after the different client downloads said data from the client.

32. The method of claim 31, further comprising:
  receiving payment for said data from a second client.

* * * * *